(12) United States Patent
Domesle et al.

(10) Patent No.: US 6,596,056 B2
(45) Date of Patent: Jul. 22, 2003

(54) PROCESS FOR COATING A CERAMIC HONEYCOMB BODY

(75) Inventors: Rainer Domesle, Alzenau (DE); Thomas Kreuzer, Karben (DE); Egbert Lox, Hanau (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/745,176

(22) Filed: Dec. 22, 2000

(65) Prior Publication Data

US 2001/0006717 A1 Jul. 5, 2001

(30) Foreign Application Priority Data

Dec. 23, 1999 (DE) .......................................... 199 62 544

(51) Int. Cl.⁷ .............................. B05D 7/22; B01D 46/00
(52) U.S. Cl. .................. 95/285; 55/DIG. 30; 502/439; 427/181; 427/299
(58) Field of Search .............................. 427/233, 236, 427/237, 230, 444, 202, 181, 299; 95/143, 285; 55/DIG. 30; 502/439

(56) References Cited

U.S. PATENT DOCUMENTS

| 4,208,454 A | 6/1980 | Reed et al. ............ 427/238 |
| 4,231,900 A | * 11/1980 | Kato et al. |
| 5,043,311 A | 8/1991 | Engler et al. ............... 524/86 |
| 5,821,187 A | * 10/1998 | Zahn et al. |
| 5,952,044 A | * 9/1999 | Deichmann et al. |
| 6,149,973 A | * 11/2000 | Foerster et al. ............. 427/235 |
| 6,248,421 B1 | * 6/2001 | Koike et al. ................ 427/116 |
| 6,514,905 B1 | 2/2003 | Hanaki et al. |

FOREIGN PATENT DOCUMENTS

| DE | 39 12 915 C1 | 12/1990 |
| DE | 199 02 540 A1 | 7/1999 |
| DE | 198 10 260 A1 | 9/1999 |
| EP | 0 399 203 | 11/1990 |
| EP | 0 941 763 | 9/1999 |
| GB | 1515733 | 6/1978 |
| JP | 49105788 A | * 10/1974 |

* cited by examiner

Primary Examiner—Duane Smith
Assistant Examiner—Frank M. Lawrence
(74) Attorney, Agent, or Firm—Kalow & Springut LLP

(57) ABSTRACT

A process for coating, with a suspension, a ceramic honeycomb body which has a cylindrical shape with two flat end-faces and one jacket, and through which channels parallel to the axis, formed by channel walls, run from one flat end-face to the other, the honeycomb body being coated by suitable processes. The honeycomb body is partially wetted and then coated.

18 Claims, 2 Drawing Sheets

PROCESS FOR COATING A CERAMIC HONEYCOMB BODY

INTRODUCTION AND BACKGROUND

The present invention relates to a process for coating a ceramic honeycomb body with a suspension.

Ceramic bodies in the form of honeycombs are used in large numbers in the field of catalysis—especially in the field of the catalytic purification of motor vehicle exhaust gases—as carriers for catalytically active coatings. The carriers have a generally cylindrical shape and are delimited by two flat end-faces and one jacket. Channels parallel to the axis, or flow channels, through which the exhaust gas to be purified is passed, run through said carriers from one flat end-face to the other. Such carriers are also referred to as honeycomb bodies.

The catalyst for converting the pollutants present in the exhaust gas (mainly hydrocarbons, carbon monoxide and nitrogen oxides) generally consists of pulverulent materials of large surface area onto which the actual catalytically active components are deposited in highly disperse form. This catalyst is applied to the separating walls between the flow channels in the form of a coating. To coat the separating walls, or channel walls, with the pulverulent materials, the first step is to prepare a coating suspension. This is usually done by suspending the pulverulent materials in water. Depending on the particular application, the solids content (dry mass of the pulverulent materials) of the suspension is conventionally between 30 and 60 wt. %, based on the total weight of the coating suspension.

Within the framework of the present invention, the application of the coating suspension to the inner surfaces of the flow channels is referred to as coating of the honeycomb body. The processes employed for this purpose, such as dipping, pouring or pumping of the suspension, are known to those skilled in the art. Patent documents GB 1,515,733, U.S. Pat. No. 4,208,454, DE 40 40 150 C2 and DE 198 10 260 A1 may be mentioned here by way of example. After application, the coating is dried and calcined.

The requisite coating concentration (dry mass of coating material per liter of honeycomb body volume [g/l]) depends on the particular application and is typically between 50 and 400 g/l. To avoid high production costs, attempts are made to apply the required amount of coating in one operation, making it necessary to use correspondingly highly concentrated coating suspensions.

A substantial problem with coating is the possible obstruction of the flow channels with excess coating material as a result of the suction capacity of the porous ceramic honeycomb bodies for the liquid phase of the coating suspension, and the consequent premature solidification of the suspension in the flow channels. To avoid this, excess coating material is removed from the flow channels by being sucked or blown clear while still in the wet state. For this to proceed with the necessary reliability, the solids content and the viscosity of the coating suspension have to be matched to the suction capacity of the honeycomb body.

The mean layer thicknesses of the catalytic coating produced in this way are in the range between about 10 and at most 100 $\mu$m, whereby considerable differences in layer thickness may exist over the cross-section of a flow channel as a result of the capillary forces which act during coating. Within the process tolerances, however, the mean layer thicknesses are identical over the entire cross-section of the honeycomb body, i.e. the mean layer thicknesses have a radially homogeneous distribution. By means of special measures during coating, radially inhomogeneous layer thickness distributions can be obtained. Thus DE 39 12 915 C1 describes honeycomb bodies with layer thicknesses of the catalytic coating which are greater in the centre of the honeycomb body than at the edge. This radial inhomogeneity is adjusted by using appropriate diaphragms when the honeycomb body is coated.

The ceramic honeycomb bodies predominantly used in exhaust gas catalysis at the present time are produced by extruding ceramic pastes. They have square or rectangular flow channels with cell densities (number of flow channels per unit cross-sectional area) of 62 $cm^{-2}$, the thickness of the channel walls being approx. 0.16 mm. The jacket delimiting the honeycomb body can have the same thickness as the channel walls. Usually, however, the jacket is designed somewhat thicker than the separating walls of the channels in order to increase the mechanical stability.

To improve the catalytic conversion of the pollutants, honeycomb bodies are being developed which have cell densities of up to 200 $cm^{-2}$ and wall thicknesses of only 0.1 mm or less. These high-cell honeycomb bodies provide an appreciably greater geometric surface for the catalytic coating and, by virtue of their smaller mass, they heat up to the operating temperature of the catalyst much more rapidly. Because of the small channel cross-sections, these high-cell honeycomb bodies tend to suffer from increased obstruction of the flow channels during coating. According to DE 198 10 260 A1, this tendency can be counteracted by wetting the entire honeycomb body evenly prior to coating, thereby saturating a substantial part of the suction capacity of the honeycomb body. However, compared with an unwetted honeycomb body, this causes an undesirable reduction in the achievable coating concentration when using an already highly concentrated coating suspension.

Because of the small wall thicknesses, the mechanical strength of the high-cell honeycomb bodies is lower than that of the conventional honeycomb bodies. To increase the mechanical strength, attempts are therefore made to provide the outer layers of flow channels, adjacent to the jacket, with larger wall thicknesses than those in the centre of the honeycomb bodies. Such honeycomb bodies provided with unequal wall thicknesses are referred to hereafter as 'inhomogeneous honeycomb bodies' for short. They are described for example in DE 199 02 540 A1.

Coating of honeycomb bodies with the coating suspension is accompanied by the danger, already described, of obstruction of the flow channels by coating material, obstructed channels being observed principally in the marginal region of the honeycomb bodies. This applies particularly to the inhomogeneous honeycomb bodies described.

An object of the present invention is therefore to provide a coating process which reduces the risk of obstructed flow channels in the marginal region of honeycomb bodies, especially of inhomogeneous honeycomb bodies.

SUMMARY OF THE INVENTION

This and other objects can be achieved by a process for coating, with a suspension, a ceramic honeycomb body which has a cylindrical shape with first and second flat end-faces and a jacket, and through which channels parallel to the axis, formed by channel walls, run from one flat end-face to the other, the honeycomb body being coated by suitable processes. The process is characterized in that the honeycomb body is partially wetted and then coated.

Within the framework of the present invention, wetting is understood as meaning the covering of the porous honeycomb body with any desired liquids or solutions, preferably of an aqueous nature. Coating is always completed by drying and calcining the honeycomb body.

The invention is based on the knowledge that, when using an identical coating suspension, less coating mass can be deposited on wetted honeycomb bodies than on dry honeycomb bodies. If the honeycomb body is only partially wetted, as proposed, it is therefore possible to deposit greater amounts of coating and to avoid channel obstructions in sections of the honeycomb body which are critical due to the coating process.

The proposed process also allows inhomogeneous distributions of the coating concentration. The inhomogeneous distribution can be produced at any desired points, both over the length of the honeycomb body and over its cross-section. The degree of saturation of the suction capacity of the porous honeycomb body can be controlled by those skilled in the art by means of the liquid volume used and optionally by introducing a waiting time between wetting and coating. The degree of saturation determines the amount of coating suspension deposited and hence the coating concentration on the coated honeycomb body.

It is particularly advantageous to wet the jacket surface of the honeycomb body. It has in fact been found that the increased number of obstructed channels in the marginal region of the honeycomb bodies is caused by the greater accumulation of honeycomb body material due to the jacket, and the resulting increased suction capacity for the liquid phase of the suspension. This applies both to honeycomb bodies whose jacket has the same thickness as the channel walls, and to honeycomb bodies with a thicker jacket, and also especially to inhomogeneous honeycomb bodies with thicker channel walls in the region of their jacket.

BRIEF DESCRIPTION OF DRAWINGS

The invention is now illustrated in greater detail with the aid of FIGS. 1 to 4.

DETAILED DESCRIPTION OF INVENTION

Figure 1:
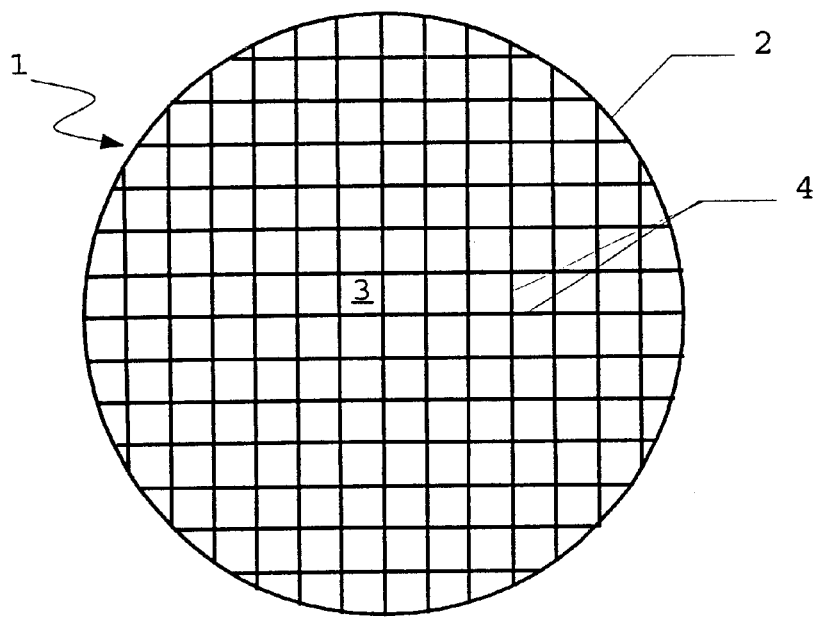
FIG. 1 is a schematic view of the flat end-face of a homogeneous honeycomb body whose jacket has the same thickness as the channel walls.

According to the invention, the suction capacity in the region of the jacket of the honeycomb bodies is at least partially saturated, prior to coating, by wetting the jacket of the honeycomb body. In this embodiment of the process, in contrast to DE 198 10 260 A1, only the jacket of the honeycomb body, and not the entire honeycomb body, is wetted. Whereas according to DE 198 10 260 A1 the coating concentration is reduced in all the flow channels by uniform wetting of the entire honeycomb body, in the proposed process this is only the case in the marginal region. In this way high coating concentrations can be obtained by means of only one coating operation, with a simultaneous reduction in the number of obstructed channels in the marginal region.

The degree of saturation and the depth of penetration of the wetting can be controlled by those skilled in the art by means of the liquid volume used and optionally by introducing a waiting time between wetting and coating. This makes it possible to reduce or even compensate the increased suction capacity in the marginal region of the honeycomb bodies. The result is a reduced tendency of the flow channels to become obstructed in the marginal zone of the honeycomb bodies.

Any of the coating processes suitable for coating honeycomb bodies can be used to coat the honeycomb bodies, i.e. to coat the wall surfaces of the flow channels. Examples which may be mentioned here are coating of the honeycomb body by dipping, pouring, pumping or aspiration of the suspension. For this purpose the suspension is fed into the flow channels from one of the two flat end-faces of the honeycomb body.

Coating can be carried out using aqueous as well as organic suspensions, for example alcoholic suspensions. Likewise, the honeycomb body can be wetted with water or an aqueous solution, but also with organic water-miscible liquids (for example alcohols) or organic water-immiscible liquids (for example hydrocarbons). Coating is preferably carried out using an aqueous suspension. Wetting of the jacket is preferably also carried out with water or an aqueous solution.

The proposed coating process not only reduces the risk of obstruction of the flow channels, but can also advantageously be used to form a radially inhomogeneous coating in the sense of DE 39 12 915 C1 cited at the outset. The fact that the saturation of the suction capacity of the honeycomb body material decreases from the jacket inwards means that the coating thickness increases from the jacket inwards. A particular factor influencing the radial layer thickness profile, in addition to the amount of liquid used, is the waiting time introduced between wetting and coating. The longer the chosen waiting time, the further the saturation of the suction capacity (by the liquid used for precovering) can penetrate into the centre of the honeycomb body. If, on the other hand, the honeycomb body is coated immediately after wetting, the danger of obstruction is essentially reduced only for the flow channels adjacent to the jacket.

There is also the possibility of wetting in a graded or stepwise manner, i.e. the jacket is wetted along the honeycomb body, from the first to the second flat end-face, with different amounts of liquid per unit area (in a stepwise or graded manner).

Of course, there is also the possibility of wetting only part of the jacket. If, for example, half of the jacket is wetted in the manner of a half-shell, a coated honeycomb body is obtained in which the layer thickness of the coating increases towards the centre over one half. Honeycomb bodies coated in this way can contribute to a desirable evening-out of the gas flow when the flow of the gas stream to be purified is uneven.

However, the process can also be used when several layers of catalyst are applied sequentially. If, for example, a honeycomb body is to be provided with two superposed layers of different catalytic action, the first layer is applied initially. The process according to the invention can already be used at this stage. The first layer is dried and fixed by calcination. It increases the suction capacity of the honeycomb body for the liquid phase of the coating suspension and hence also the danger of obstruction of flow channels by the coating material of the second layer in the jacket region of the honeycomb body. The process according to the invention can thus be used to advantage particularly when applying a further layer to honeycomb bodies which have already been coated at least once. Furthermore, it is possible to accommodate the desire for a spatially variable coating concentration of the layer to be applied.

Another field of application of the proposed process is the coating of honeycomb bodies with particularly high coating concentrations in several successive coating operations.

Figure 2:
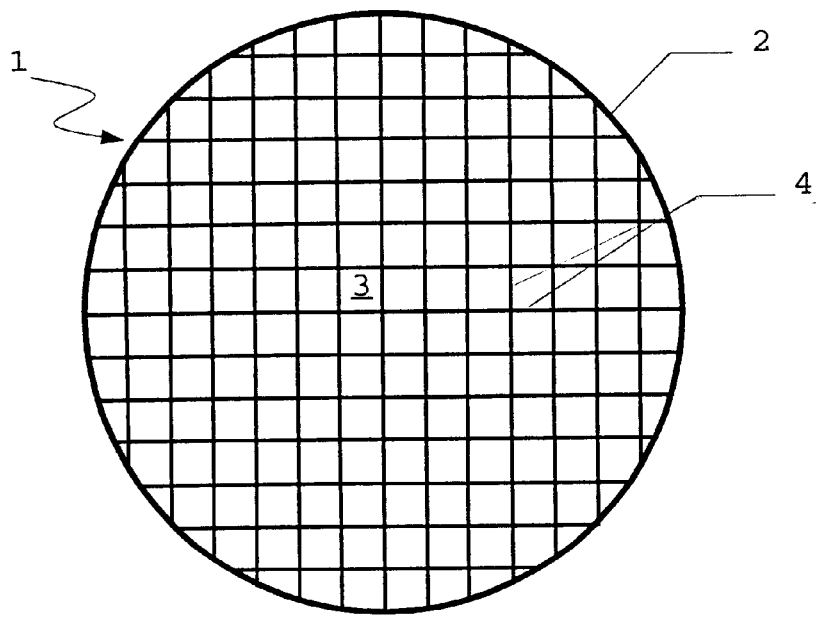
FIG. 2 is a schematic view of the flat end-face of a homogeneous honeycomb body whose jacket has a greater thickness than the channel walls.
Figure 3:
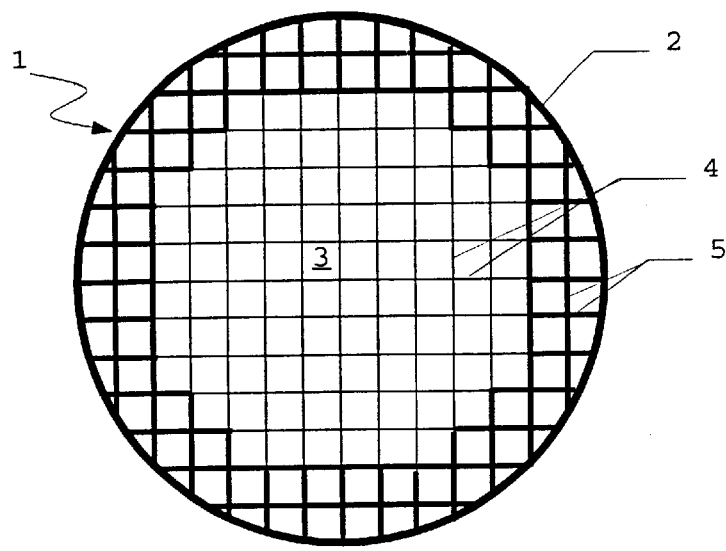
FIG. 3 is a schematic view of the flat end-face of an inhomogeneous honeycomb body.

FIGS. 1 to 3 show different honeycomb bodies, each with a circular cross-section. FIG. 1 shows a homogeneous honeycomb body whose jacket has the same thickness as the channel walls. Within the framework of the present invention, a honeycomb body is referred to as homogeneous if the channel walls have the same thickness over the entire cross-section of the honeycomb body. In an inhomogeneous honeycomb body, by contrast, the thickness of the channel walls is greater in the marginal region of the cross-section than in the central region. In FIGS. 1 to 3, reference numeral (1) denotes the honeycomb body, (2) denotes the jacket of the honeycomb body, (3) denotes a flow channel and (4) denotes the channel walls, or separating walls, between the flow channels. FIGS. 1 to 3 show honeycomb bodies in which the flow channels have a square cross-section and are distributed in a uniform array over the cross-section of the honeycomb body. However, the process is also equally applicable to honeycomb bodies with other channel cross-sections—rectangular, triangular or hexagonal.

FIG. 2 shows a homogeneous honeycomb body whose jacket has a greater thickness than the channel walls.

FIG. 3 is a view of a flat end-face of an inhomogeneous honeycomb body. The flow channels are delimited by the channel walls (4) or (5). In an outer marginal zone adjoining the jacket of the honeycomb body, which comprises for instance 2 layers of flow channels, the channel walls (5) are thicker than the channel walls (4) inside the honeycomb body in order to increase its mechanical stability.

Figure 4:
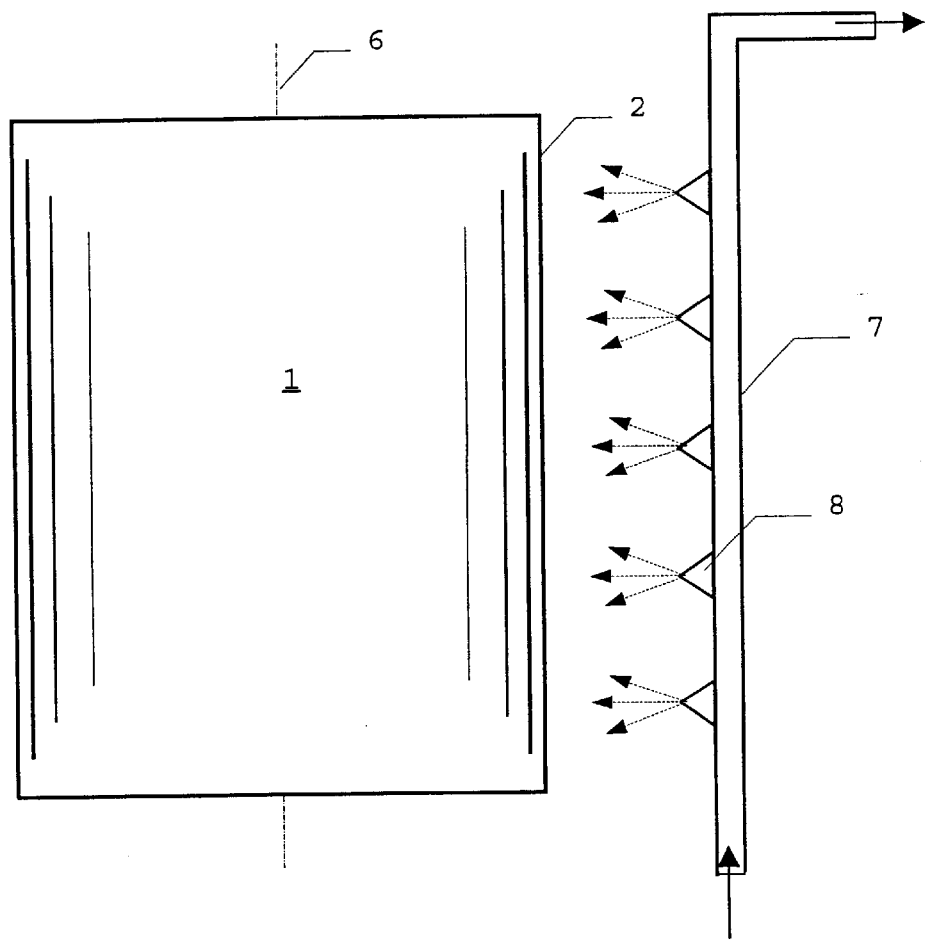
FIG. 4 shows a schematic representation of the wetting of the jacket of a honeycomb body prior to coating.

The wetting, according to the invention, of the jacket of the honeycomb body prior to coating can be carried out using different arrangements. One of these is shown in FIG. 4. The honeycomb body is rotated about its central axis (6) in front of a row of spray nozzles (8). The spray nozzles (8) are supplied with liquid through a common feed tube (7). In this way the jacket (1) of the honeycomb body can be precovered with a defined amount of liquid. Wetting can easily be effected in a stepwise or graded manner, as described above, by designing the spray nozzles appropriately or supplying the spray nozzles with different amounts of liquid.

Alternative methods, which are suitable especially for the non-uniform wetting of central regions of the honeycomb body, are wetting with a spray jet from one or both flat end-faces. Any excess liquid accumulating in the channels can be removed by blowing or sucking and—if desired—the amount of liquid can thus also be evened out over the length of the honeycomb body.

Also, with appropriate screening, a liquid aerosol can be applied to the honeycomb body, it being possible for the liquid aerosol to be passed through the honeycomb body with a carrier gas stream. This method allows an inhomogeneous distribution of the coating thickness over the length of the honeycomb body. Rather than liquid aerosols, it is also possible to pass vaporized liquids through the honeycomb body, said vapours condensing on the cold channel walls of the honeycomb body.

Further variations and modifications of the foregoing will be apparent to those skilled in the art and are intended to be encompassed by the claims appended hereto.

German priority application 199 62 544.1 is relied on and incorporated herein by reference. Wetting can also be effected very easily by rolling a wet sponge or cloth over the jacket of the honeycomb body.

What is claimed is:

1. A process for coating a ceramic honeycomb body which has a cylindrical shape and a main axis with a first and a second flat end-face and a jacket, and through which body channels parallel to the main axis, formed by channel walls, run from the first flat end-face to the second flat-end face, comprising only partially wetting the honeycomb body and then coating said honeycomb body with a coating suspension containing pulverulent materials and having a solids content of 30 to 60 weight % based on the total weight of the coating suspensions wherein said process results in said body channels being unobstructed by said coating.

2. The process according to claim 1, wherein only the jacket of the honeycomb body is wetted.

3. The process according to claim 1 further comprising interposing a waiting time between the wetting and the coating of the honeycomb body.

4. The process according to claim 2 further comprising interposing a waiting time between the wetting and the coating of the honeycomb body.

5. The process according to claim 1 wherein the jacket is wetted with water or an aqueous solution.

6. The process according to claim 2 wherein the jacket is wetted with water or an aqueous solution.

7. The process according to claim 3 wherein the jacket is wetted with water or an aqueous solution.

8. The process according to claim 1 wherein the thickness of the channel walls of the honeycomb body in a marginal zone extending from the jacket into the interior of the honeycomb body is greater than in the remainder of the honeycomb body.

9. The process according to claim 1, wherein the honeycomb body already has at least one coating.

10. The process according to claim 2 further comprising wetting the jacket by rotating the honeycomb body in front of a nozzle or rolling the honeycomb body over a wet sponge or cloth.

11. The process according to claim 9 further comprising wetting the jacket by rotating the honeycomb body in front of a nozzle or rolling the honeycomb body over a wet sponge or cloth.

12. The process according to claim 1, further comprising, for partial wetting of the honeycomb body, applying the wetting liquid by spraying through or over said honeycomb body with the aid of liquid aerosols or by the condensation of vaporized liquids.

13. The process according to claim 9, further comprising, for partial wetting of the honeycomb body, applying the wetting liquid by spraying through or over said honeycomb body with the aid of liquid aerosols or by the condensation of vaporized liquids.

14. A process according to claim 1, wherein said honeycomb body is an inhomogenous honeycomb body.

15. A coated honeycomb body produced by the process according to claim 1.

16. A coated honeycomb body produced by the process according to claim 10.

17. A coated body produced by the process according to claim 9.

18. A process for the purification of exhaust gas from an internal combustion engine comprising passing the exhaust gas through the honeycomb body produced according to claim 1.

\* \* \* \* \*